United States Patent Office 2,985,425
Patented May 23, 1961

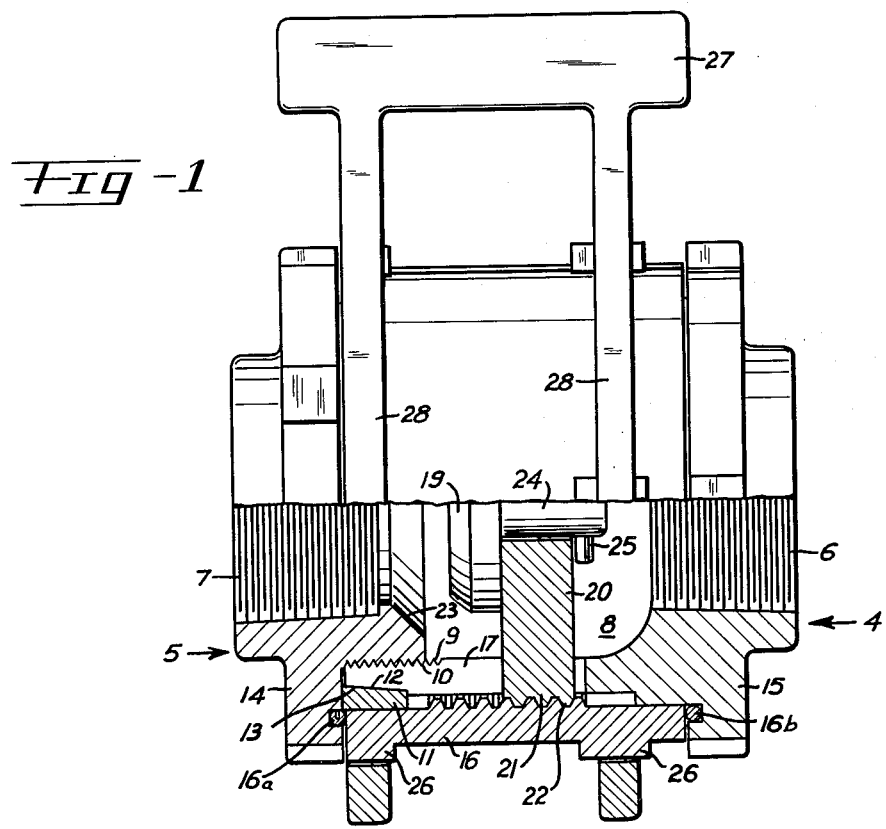
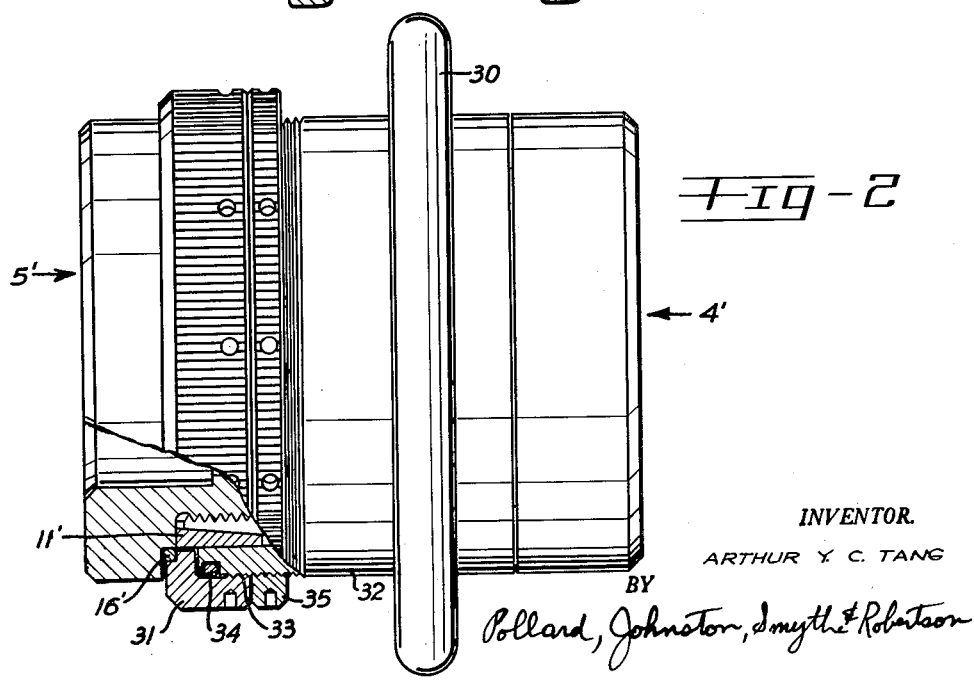

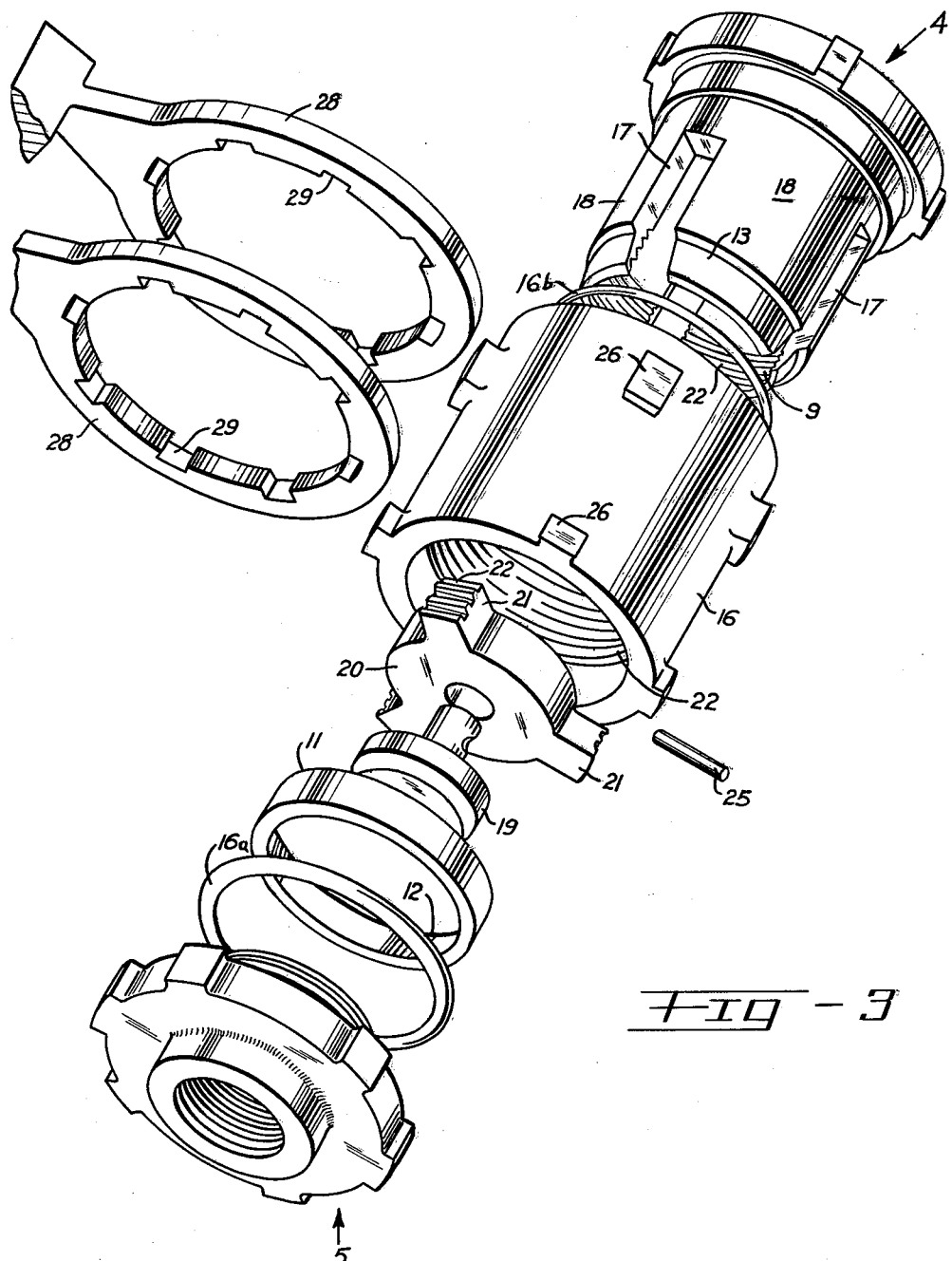

2,985,425
VALVE
Arthur Y. C. Tang, Brockton, Mass., assignor to Walworth Company, New York, N.Y., a corporation of Massachusetts
Filed Feb. 3, 1959, Ser. No. 790,949
10 Claims. (Cl. 251—340)

The present invention has to do with an "in-line" globe valve whose valve disc is moved by rotational movement of a sleeve about the axis of two pipes whose ends are connected by the valve. In valves of this type, difficulty is experienced in making the sleeve which moves the valve disc freely movable without permitting leakage through the valve body to the exterior. The valve embodying my invention causes a relatively low pressure drop across the valve since it has the same opening as the pipe; it is particularly adapted to motorized operation and produces a tight shut-off.

According to my invention, two body parts are screwed together, one of these body parts having an inclined peripheral face engaging a complementary inclined face of a ring, which ring is wedged about the body parts when they are screwed together. This serves to reinforce the valve against radially outward stresses and also furnishes an effective friction lock to prevent the parts of the valve body from shaking loose by vibration or unscrewing when the operating sleeve is rotated during normal actuation of the valve.

One of the body parts has a cylindrical valve chamber section the walls of which are slotted lengthwise of the valve so that this section is divided into a number of arcuate segments. This slotted construction, being somewhat resilient, contributes to the effectiveness of the friction lock as the ring wedges the arcuate segments inwardly to built up friction between the two body parts as they are screwed home. Conversely, the ring reinforces the valve body, bridging it across the slots. The slots, in addition to their function in creating resiliency to assist in providing an effective vibration lock, perform the further functions of furnishing guides and openings for the arms of a member (spider) which carries the valve disc. As openings, the slots permit the arms of the spider to extend outwardly for threaded engagement with an actuating sleeve to provide for axial movement of the valve disc. As guides, the slots prevent the spider from rotating and thereby assure a good seal between the valve disc and its seat without scoring the sealing surfaces due to rotational motion.

The two body parts of my valve have peripheral sealing flanges arranged in spaced axial alignment, and the actuating sleeve, which surrounds portions of the connected body parts has its ends adjacent opposed faces of the peripheral sealing flanges. Sealing means are disposed between such opposed sealing faces and the ends of the sleeve. In one form the actuator sleeve is made in two parts threaded together or otherwise arranged for relative axial movement to adjust the effective length of the actuator sleeve. This makes it possible to secure a predetermined loading on the sealing means and to compensate for wear and deflection. In one form means are also provided for locking the two sleeve parts in selected positions of adjustment. Two sets of circumferentially spaced lugs on the exterior of the actuator sleeve, together with a handle including spaced rings surrounding the sleeve and notched interiorly for engagement with the lugs on the sleeve, provide means for turning the actuator sleeve to operate the valve. The handle is movable into several alternate positions of engagement with the sleeve, whereby the sleeve can be turned by oscillating the handle through less than a full circumferential arc of movement about the turning axis of the sleeve. In my preferred construction, the gripping portion of the handle extends between the spaced rings in a direction substantially parallel to the turning axis of the sleeve.

With my construction, the only member highly stressed by the fluid pressure within the valve is the actuator sleeve. The valve mechanism is concentric to the center line of the valve assembly and thus affords an optimum ratio of structural strength to weight of material in the valve.

With reference to the drawings I shall now describe the best mode contemplated by me for carrying out my invention.

Fig. 1 is a side elevational view, partly broken away in central longitudinal section, of a valve embodying principal features of my invention.

Fig. 2 is a similar view showing an alternate form of my valve.

Fig. 3 is an exploded perspective view of the valve of Fig. 1.

Referring to Figs. 1 and 3, my improved valve construction comprises two body parts 4 and 5 each having a pipe opening therein, 6 and 7 respectively. The pipe openings are in spaced axial alignment with a valve chamber 8 between them. Mating screw threads 9, 10 provide means for securing the body parts together, and a supporting ring 11 surrounds at least a portion of the mating threads. This supporting ring has an inclined inner face 12 engaging a complementary inclined outer face 13 of body part 4. The ring provides a reinforcement for the valve body in radial alignment with the threaded connection between the two body parts. Body part 5 has a peripheral flange 14 engaging an end face of ring 11 whereby as the two body parts are screwed tightly together the ring is wedged against surface 13 of body part 4 and is driven axially against flange 14 of body part 5 furnishing a tight friction lock to prevent the parts of the valve body from being loosened in use. Body part 4 has a peripheral flange 15 in spaced axial alignment to flange 14, and a cylindrical actuator sleeve 16 surrounds the connected body parts with the ends of the sleeve adjacent the opposed inner faces of flanges 14 and 15. Sealing rings 16a and 16b retained in grooves in such opposed inner faces furnish sealing means between such faces and the ends of the actuator sleeve.

The cylindrical valve chamber section of body part 4 has walls provided with slots 17 extending lengthwise of the valve. These slots divide the cylindrical walls into a number of arcuate segments 18. This slotted construction, being somewhat resilient—especially when the valve parts are made of plastic such as an epoxy resin —contributes to the effectiveness of the friction lock described in the preceding paragraph as the ring 11 wedges the arcuate segments inwardly to build up friction between the mating threads 9, 10 as the two body parts are screwed together.

A valve disc 19 within chamber 8 is carried by, and freely rotatable in, a support 20 (spider) having radial arms 21 extending through slots 17 of body part 4. The outer circumferential ends of these arms have threaded engagement at 22 with the inside of acuator sleeve 16, and the guiding engagement between the arms of the spider and the sides of slots 17 keep the spider from turning when the actuator sleeve 16 is turned to move valve disc 19 toward or away from its seat 23 in body part 5. Valve disc 19 is mounted in the spider by means of a projection 24 on the disc which extends through an opening in the spider and is held by a retaining pin 25.

Means are provided for turning the actuator sleeve 16 to operate the valve. As shown this means comprises two sets of spaced acuator lugs 26 on the exterior of the sleeve, and a handle 27 including spaced rings 28 surrounding the sleeve. The rings 28 are notched interiorly at 29 for engagement with the lugs and the gripping portion of the handle, 27, extends between the spaced rings in a direction substantially parallel to the turning axis of the sleeve. The sleeve can be turned by moving the handle circumferentially and then axially into selected alternate positions of engagement with the sleeve, oscillating the handle through less than a full circumferential arc of movement about the turning axis of the sleeve.

The alternate construction shown in Fig. 2 is essentially the same as that which has been described with reference to Figs. 1 and 3 except as follows: Oscillating handle 27 is replaced by a fixed circumferential hand wheel 30 fixed to the actuator sleeve, and the actuator sleeve is made in two parts 31, 32 threaded together as at 33 to furnish means for producing relative axial movement between the two to adjust the length of the sleeve. A sealing ring 34 carried in a groove in part 32 provides a seal between the two parts of the sleeve, and a lock nut 35 holds the parts in selected positions of adjustment. This construction makes it possible to secure a predetermined loading on the sealing means 16' and to compensate for wear and deflection. [Primed numbers indicate parts corresponding to those designated by unprimed numbers in Figs. 1 and 3]. If desired, my valve can be provided with a motor driven actuator.

The terms and expressions which I have employed are used in a descriptive and not a limiting sense, and I have no intention of excluding such equivalents of the invention described as fall within the scope of the claims.

I claim:

1. A valve comprising two body parts each having a pipe opening therein and the pipe openings being in spaced axial alignment with a valve chamber between them, mating screw threads on the respective body parts for securing them together, and a supporting ring surrounding at least a portion of said mating screw threads, said ring and one of the body parts having complementary inclined faces engaging each other, the other of said body parts being in contact with an end face of the ring and forcing the two complementary inclined faces against each other when the body parts are screwed together.

2. A valve comprising two body parts each having a pipe opening therein and the pipe openings being in spaced axial alignment with a valve chamber between them, mating screw threads on the respective body parts for securing them together, and a supporting ring surrounding at least a portion of said mating screw threads, said ring and one of the body parts having complementary inclined engaging faces, and the other body part having a peripheral flange engaging an end face of the ring whereby as the two body parts are screwed tightly together the ring is wedged radially against said one of the body parts over the complementary inclined engaging faces thereon and is driven axially against said peripheral flange of said other body part, furnishing a tight friction lock to prevent the valve body from being loosened by vibration in use.

3. A valve in accordance with claim 2, in which said one body part has a peripheral flange in spaced axial alignment to the peripheral flange of said other body part, and which includes an actuator sleeve surrounding the connected body parts with the ends of the sleeve adjacent the opposed inner faces of the respective peripheral flanges, and sealing means between said opposed inner faces and the ends of the actuator sleeve.

4. A valve in accordance with claim 3, which includes an axially movable valve disc driven by said actuator sleeve for engagement with a seat formed in one of the body parts.

5. A valve comprising two body parts each having a pipe opening therein and a peripheral sealing flange, the pipe openings and peripheral sealing flanges being in spaced axial alignment with a valve chamber between the openings, mating screw threads on the body parts one of said body parts being separated into fingers by axial slots, a supporting ring movable lengthwise of the axis of the valve surrounding at least a portion of said mating screw threads and engaged by both said body parts, said ring and one of the body parts having complementary inclined annular engaging faces urging said fingers inwardly toward the axis when said ring is moved lengthwise of the axis by movement of one of said body parts toward the other, a seat formed in one of the body parts, a longitudinally movable valve disc within said chamber, a spider having radial arms slidable in said slots and having screw threads on the circumferential surfaces of said arms, and actuating means for said valve disc, said means including an actuator sleeve surrounding the connected body parts with the ends of the sleeve adjacent opposed faces of said peripheral sealing flanges, and sealing means between said opposed faces and the ends of the sleeve.

6. A valve in accordance with claim 5, in which said sealing means comprises annular recesses in said opposed faces of the sealing flanges and sealing rings received in said annular recesses and engaging the ends of the actuator sleeve.

7. A valve comprising two body parts each having a pipe opening therein and a peripheral sealing flange, the pipe openings and peripheral sealing flanges being in spaced axial alignment with a valve chamber between the openings, mating screw threads on the body parts one of said body parts being separated into fingers by axial slots, a supporting ring movable lengthwise of the the axis of the valve surrounding at least a portion of said mating screw threads and engaged by both said body parts, said ring and one of the body parts having complementary inclined annular engaging faces urging said fingers inwardly toward the axis when said ring is moved lengthwise of the axis by movement of one of said body parts toward the other, a seat formed in one of the body parts, a longitudinally movable valve disc within said chamber, a spider having radial arms slidable in said slots and having screw threads on the circumferential surfaces of said arms, and actuating means for said valve disc, said means including an actuator sleeve surrounding the connected body parts with the ends of the sleeve adjacent opposed faces of said peripheral sealing flanges, said actuator sleeve comprising two parts threaded together for relative axial movement to adjust the length of the actuator sleeve, and sealing means between said opposed faces of the sealing flanges and the ends of the sleeve.

8. A valve in accordance with claim 7, in which the actuating sleeve also includes sealing means between its two parts and means for locking the two parts in selected positions of adjustment to secure a predetermined loading on the sealing means at the ends of the actuator sleeve and/or compensate for wear and deflection.

9. A valve in accordance with claim 1, in which said one body part has slots extending longitudinally of the valve, said slots dividing said inclined engaging faces of said one body part into a plurality of arcuate segments, said ring through the engagement of said complementary inclined engaging faces serving to wedge said arcuate segments inwardly to increase the friction between the mating threads of the two body parts as they are screwed together.

10. A valve in accordance with claim 9, which includes a valve disc within said valve chamber, and actuating means to produce axial movement of said valve disc, said actuating means including a support for the valve disc, said support having radial arms extending into said longitudinally extending slots of said one body part.

References Cited in the file of this patent

UNITED STATES PATENTS

| | | |
|---|---|---|
| 903,451 | Clark | Nov. 10, 1908 |
| 1,759,060 | Moore | May 20, 1930 |
| 2,630,134 | Nystul | Mar. 3, 1953 |
| 2,733,937 | Mowrer | Feb. 7, 1956 |
| 2,826,437 | Detweiler | Mar. 11, 1958 |
| 2,873,985 | Baldwin | Feb. 17, 1959 |